United States Patent [19]

Braune

[11] Patent Number: 5,610,231

[45] Date of Patent: Mar. 11, 1997

[54] PREPARATION OF THERMOPLASTIC POLYESTERS

[75] Inventor: Peter Braune, Erbes-Büdesheim, Germany

[73] Assignee: BASF Aktiengesellschaft, Ludwigshafen, Germany

[21] Appl. No.: 633,521

[22] Filed: Apr. 17, 1996

Related U.S. Application Data

[63] Continuation of Ser. No. 314,906, Sep. 29, 1994, abandoned.

[30] Foreign Application Priority Data

Oct. 5, 1993 [DE] Germany .......................... 43 33 930.1

[51] Int. Cl.⁶ .............................. C08K 3/08; C08G 63/83
[52] U.S. Cl. .................... 524/779; 528/275; 528/302; 528/307; 528/308; 528/308.6; 524/765; 524/777
[58] Field of Search ..................... 528/275, 302, 528/307, 308, 308.6; 524/765, 777, 779

[56] References Cited

U.S. PATENT DOCUMENTS

| 4,107,149 | 8/1978 | Bier et al. ............................. | 528/309 |
| 4,705,844 | 11/1987 | Espenschied et al. .................. | 528/275 |
| 4,845,186 | 7/1989 | Chujo et al. ............................ | 528/272 |

FOREIGN PATENT DOCUMENTS

| 29285 | 5/1984 | European Pat. Off. . |
| 215364 | 3/1987 | European Pat. Off. . |

Primary Examiner—Samuel A. Acquah
Attorney, Agent, or Firm—Keil & Weinkauf

[57] ABSTRACT

Thermoplastic polyesters are prepared by multistage polycondensation of dihydroxy compounds with dicarboxylic acids or esters or ester-forming derivatives thereof by a process in which, in at least one first stage, an alkali metal compound or an alkaline earth metal compound is added in an amount of from 1 to 10 mmol, calculated as alkali metal or alkaline earth metal, per kg of polyester, and at least one further stage is carried out as a solid-phase condensation.

8 Claims, No Drawings

PREPARATION OF THERMOPLASTIC POLYESTERS

This application is a continuation of application Ser. No. 08/314,906, filed on Sep. 29, 1994 now abandoned.

The present invention relates to a process for the preparation of thermoplastic polyesters by multistage polycondensation of dihydroxy compounds and dicarboxylic acids or esters or ester-forming derivatives thereof.

Processes of the abovementioned type are carried out worldwide on a large industrial scale in particular for the preparation of polyalkylene terephthalates.

In order to increase the molecular weight, a solid phase post-condensation is frequently carried out in at least a second stage of the reaction.

There is a need for improvements with regard to the long residence time required for this purpose and the associated thermal stress to which the polyesters are subjected and which leads to undesirable speck and gel formation.

The presence of alkali metal compounds in the polycondensation in order to increase the crystallinity or the rate of crystallization of the polyesters is known per se and is described, for example, in EP-A 215 364 and EP-A 29 285. The amounts of added alkali metal compound are from about 0.1 to 2% by weight, based on polyester, according to EP-A 29 285, or from 0.02 to 1 mol per kg of polyester (EP-215 364). However, such relatively large amounts are also disadvantageous in the end product for some applications.

It is an object of the present invention to provide a process for the preparation of polyesters of the type stated at the outset, which process gives a substantially speck-free and gel-free product and requires a shorter polycondensation time overall.

We have found that this object is achieved, according to the invention, by a process for the preparation of thermoplastic polyesters by multistage polycondensation of dihydroxy compounds with dicarboxylic acids or esters or ester-forming derivatives thereof, wherein, in at least one first stage, an alkali metal compound or an alkaline earth metal compound is added in an amount of from 1 to 10 mmol, calculated as alkali metal or alkaline earth metal, per kg of polyester, and at least one further stage is carried out as a solid-phase condensation.

In the novel process, polyesters which have a high molecular weight and are substantially speck-free and gel-free are obtainable at a shorter polycondensation time, in particular in the solid-phase condensation.

Aliphatic, aromatic or cycloaliphatic diols may be used as dihydroxy compounds.

These are advantageously of 2 to 20, in particular 2 to 12, carbon atoms, and aliphatic diols of 2 to 12, in particular 2 to 6, carbon atoms are particularly preferred.

Examples of these are ethanediol (ethylene glycol), 1,3-propanediol, 1,4-butanediol, cyclohexanediols, hydroquinone, resorcinol and bisphenol A, among which ethanediol and 1,4-butanediol are particularly preferred.

The dicarboxylic acids used may be aliphatic and/or aromatic dicarboxylic acids of, preferably, 4 to 20, in particular 4 to 12, carbon atoms.

Examples are isophthalic acid, phthalic acid, terephthalic acid, alkyl-substituted derivatives of the abovementioned acids, 2,6- and 2,7-naphthalenedicarboxylic acids, aliphatic dicarboxylic acids, such as succinic acid, adipic acid, sebacic acid, azelaic acid and decanedicarboxylic acid, among which isophthalic and terephthalic acid or mixtures thereof are particularly preferred.

From the above, it is evident that polyalkylene terephthalates or polyalkylene isophthalates or copolyesters with terephthalic and isophthalic acid as acid components can be particularly advantageously prepared by the novel process.

In addition to the abovementioned components, the polyesters prepared according to the invention may also contain relatively small amounts, advantageously less than 10 mol %, based on the particular monomer component, of further units which are derived, for example, from hydroxy carboxylic acids.

In the novel process, from 1 to 10, preferably from 2 to 7, in particular from 2.5 to 5, mmol, per kg of polyester, of an alkali metal compound or of an alkaline earth metal compound (calculated as alkali metal or alkaline earth metal) are added in a manner known per se in a first stage during the reaction of the starting monomers.

Inorganic and organic compounds of the alkali metals, preferably of Li, Na or K, particularly preferably Na compounds, are in principle suitable.

Examples of suitable inorganic compounds of the alkali metals or alkaline earth metals, preferably of sodium, are the corresponding silicates, phosphates, phosphites, sulfates or preferably carbonates, bicarbonates and hydroxides.

The organic compounds of the alkali metals and alkaline earth metals, preferably of sodium, include the corresponding salts of (cyclo)aliphatic, araliphatic or aromatic carboxylic acids having, preferably, up to 30 carbon atoms and, preferably, from 1 to 4 carboxyl groups. Examples of these are alkali metal salts of formic acid, acetic acid, propionic acid, butyric acid, isobutyric acid, caprylic acid, stearic acid, cyclohexanecarboxylic acid, succinic acid, adipic acid, suberic acid, 1,10-decanedicarboxylic acid, 1,4-cyclohexanecarboxylic acid, terephthalic acid, 1,2,3-propanetricarboxylic acid, 1,3,5-cyclohexanetricarboxylic acid, trimellitic acid, 1,2,3,4-cyclopentanetetracarboxylic acid, pyromellitic acid, benzoic acid, substituted benzoic acids, dimeric acids and trimeric acids as well as neutral or partly neutralized montan wax salts or montan wax ester salts (montanates). Salts with other types of acid radicals, for example alkali metal paraffin sulfonates, alkali metal olefinsulfonates and alkali metal arylsulfonates or phenolates and alcoholates, such as methanolates, ethanolates or glycolates, may also be used according to the invention. Sodium carbonate, sodium bicarbonate, sodium hydroxide, sodium salts of mono- and polycarboxylic acids, in particular the aliphatic mono- and polycarboxylic acids, preferably those having 2 to 18, in particular 2 to 6, carbon atoms and up to four, preferably up to two, carboxyl groups and sodium alcoholates of, preferably, 2 to 15, in particular 2 to 8, carbon atoms are preferably used. Examples of particularly preferred members are sodium acetate, sodium propionate, sodium butyrate, sodium oxalate, sodium malonate, sodium succinate, sodium methanolate, sodium ethanolate and sodium glycolate. Sodium methanolate is very particularly preferred and is particularly advantageously used in an amount of from 2.5 to 5 mmol, calculated as Na. Mixtures of different alkali metal or alkaline earth metal compounds may also be used.

The alkali metal or alkaline earth metal or the alkali metal compound or alkaline earth metal compound is added at any time during a first stage of the synthesis of the polyester, which in general is carried out by the esterification/polycondensation process, but preferably by the transesterification/polycondensation process. When the transesterification/polycondensation process is used, addition at the beginning of the transesterification is particularly preferred. The esterification/polycondensation process and the transesterification/polycondensation process are well known and are described, for example, in Ullmann's Encyklopädie der technischen Chemie (4th edition) 19 (1980), 61–88.

EXAMPLE

In the preparation of a polyester from dimethyl terephthalate and 1,4-butanediol by the transesterification/polycondensation process, 4 mmol of sodium in the form of sodium methanolate (per kg of polyester which is formed on complete stoichiometric reaction) were added during the transesterification and, after a first condensation in the melt or in solution, the product was subjected to a solid-phase condensation in a second stage.

Compared with a reaction carried out without sodium methanolate under otherwise identical conditions, a substantially more rapid increase in molecular weight was observed and the product obtained had a substantially lower speck and gel content.

We claim:

1. In a process for the production of a thermoplastic polyester by multistage polycondensation of dihydroxy compounds with dicarboxylic acids or esters or ester-forming derivatives thereof, the improvement wherein in at least one first stage an alkali metal alcoholate or an alkaline earth metal alcoholate is added in an amount of from 1 to 10 mmol, calculated as alkali metal or alkaline earth metal per kg of polyester, and at least one further stage is carried out as a solid-phase condensation, which improvement results in a substantially speck-free and gel-free high molecular weight thermoplastic polyester.

2. The process defined in claim 1, wherein the first stage is carried out in the presence of an alkali metal alcoholate.

3. The process defined in claim 1, wherein the alkali metal compound is sodium methanolate.

4. The process defined in claim 1 wherein the amount of alkali metal alcoholate or alkaline earth metal alcoholate added per kg of polyester is from 2 to 7 mmol.

5. The process defined in claim 1 wherein the amount of alkali metal alcoholate or alkaline earth metal alcoholate added per kg of polyester is from 2.5 to 5 mmol.

6. The process defined in claim 1 wherein the dihydroxy compound is ethanediol or 1,4-butanediol.

7. The process defined in claim 6, wherein the dicarboxylic acid is terephthalic acid or dimethylterephthalate.

8. The process of claim 1, wherein the dicarboxylic compound is dimethylterephthlate, the dihydroxy compound is 1,4-butandiol and the alcoholate is sodium methanolate.

* * * * *